Jan. 24, 1967  L. N. LEA  3,299,523
LEVELS
Filed June 5, 1964
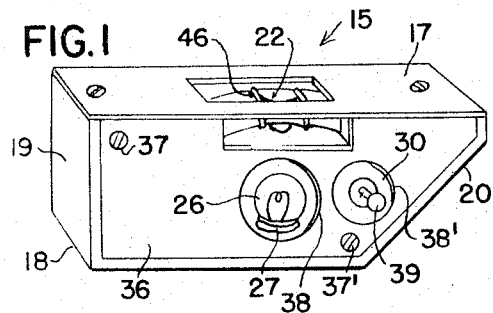
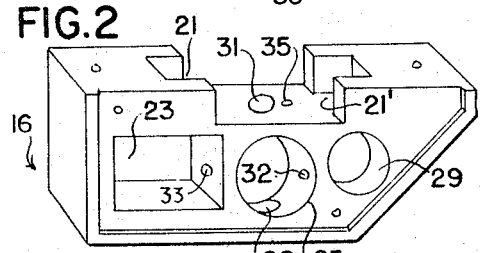
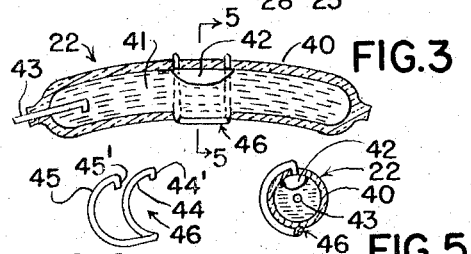
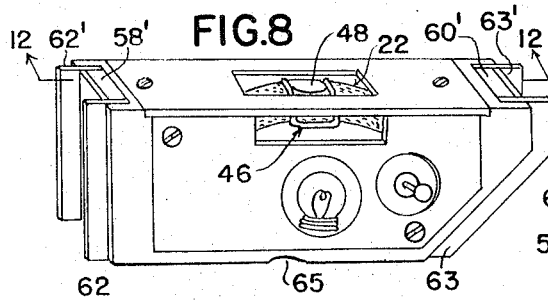
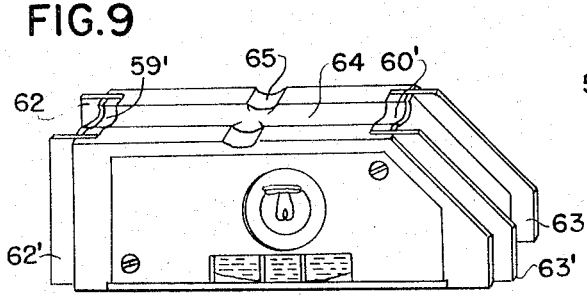
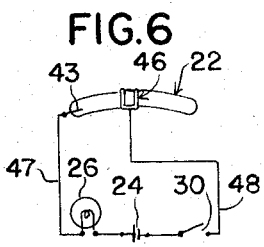
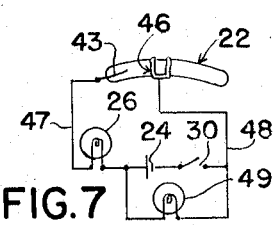
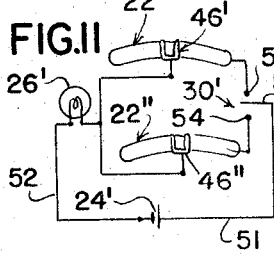
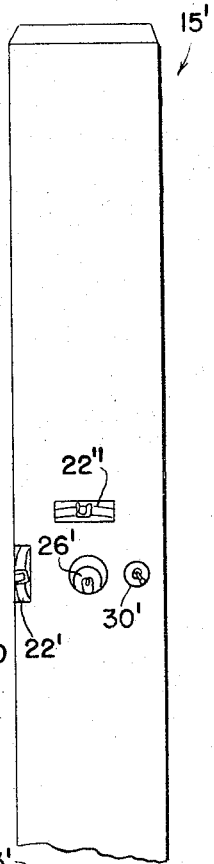
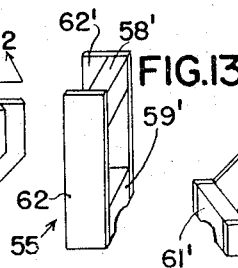
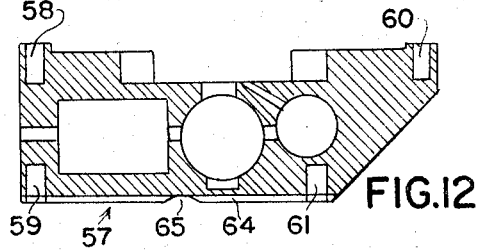
INVENTOR
Lawrence N. Lea
BY
ATTORNEY.

United States Patent Office 3,299,523
Patented Jan. 24, 1967

3,299,523
LEVELS
Lawrence N. Lea, 1683 University Ave.,
Bronx, N.Y. 10453
Filed June 5, 1964, Ser. No. 372,849
1 Claim. (Cl. 33—211)

The present invention relates to a level employing a cartridge comprising an envelope filled with a liquid but containing a bubble.

The principal object of this invention is to provide a novel and improved level of the type mentioned, offering a signal when the level is in true position. Preferably, this signal is the extinguishment of an electric light bulb which is actuated until the true level position is attained.

Another object thereof is to provide a level of the character described, involving novel and improved construction, functional relationship of parts and mode of operation.

A further object thereof is to provide a novel and improved level and flashlight combination, in which a diminution in light intensity is the signal to indicate that the level is in true position.

Still a further object is to provide a level with a signal device of novel and improved construction, having the mentioned attributes and which is simple in construction, reasonably priced for sale and efficient and convenient in use.

Other objects and advantages will become apparent as this disclosure proceeds.

For the practice of this invention, the liquid in the cartridge is conductive and it is the bubble therein when at true position, that encompasses and isolates a conductor so the signal circuit is opened. When the level is out of true position, said conductor contacts the liquid, thereby closing the signal circuit.

Any signal-giving device may be used which may be carried by the level and actuatable by a dry cell, all preferably housed in hollows in the level's body. For instance, it may be a buzzer, but most practical, such signal means is chosen and shown herein to be a small incandescent electric light bulb. It is therefore desired that any mention of a light bulb herein shall be deemed to include any means likewise actuatable so as to be perceptible by any of a person's senses.

Also shown herein is a modified embodiment having a circuit including two bulbs, one of which is constantly actuated while the level is in use; the other serving as the signal. Hence when the level is in true position in this construction, the second lamp will be deactuated and there will occur a diminution in total light intensity.

In another modified construction, magnet means are included along the end edges of the level body.

In the accompanying drawing forming part of this specification, similar characters of reference indicate corresponding parts in all the views.

FIG. 1 is a perspective view showing a level embodying teachings of this invention.

FIG. 2 is a perspective view of the body member of the level.

FIG. 3 is an enlarged lengthwise view of the bubble cartridge and its appurtenances.

FIG. 4 is a perspective view of a conductive element which is isolated from the conductive liquid in the cartridge when the level is in true position.

FIG. 5 is a section taken at line 5—5 in FIG. 3.

FIG. 6 is a diagrammatic showing of the electrical circuit employed in this device.

FIG. 7 is another circuit diagram which may be used when a second bulb is added to the structure shown in FIG. 1.

FIG. 8 is a perspective view of a modified construction which essentially is the level of FIG. 1 provided with magnetic channel structures along its side edges.

FIG. 9 is a perspective view of FIG. 8 inverted.

FIG. 10 shows a carpenter's or bricklayer's level having two cartridges taught herein. This view is fragmentary and is shown in perspective.

FIG. 11 is the circuit diagram which may be employed for the level shown in FIG. 10.

FIG. 12 is a section taken at line 12—12 in FIG. 8 showing only the body member of the level.

FIGS. 13 and 14 are perspective views showing the magnet structures included in the embodiment shown in FIG. 8. These structures are of separate pieces, but these views show such pieces in the associations they assume when assembled with the body member.

In the drawing, the numeral 15 designates generally a preferred form of level whose body member denoted generally by the numeral 16 has parallel top and bottom surfaces indicated respectively by the numerals 17 and 18, an end surface 19 perpendicular to said surfaces 17, 18, and the other end surface 20 which is at an angle of 135 degrees to said bottom surface 18. Said body member may be of wood, aluminum, plastic or other suitable material and as shown, is provided with hollows offering the seats 21, 21' to locate and mount the ends of the cartridge designated generally by the numeral 22, a socket 23 to hold the dry cell 24, a hole 25 to expose the light bulb 26 which is set in a socket 27 positioned in the body socket 28, and the socket 29 to hold a switch 30. There is also a hole 31 to allow the bulb 26 to illuminate the cartridge 22 and the holes 32, 33, 34, 35 for wires to make the required connections as shown in the circuit diagram of FIG. 6. A plate 36 attached by the screws 37, 37', closes the body member and has appropriate holes 38 and 38' to expose the bulb 26 and the operating member 39 of the switch 30. The top surface of the body is offered by a detachable plate having a window 17' over the body opening to expose the cartridge 22 which is filled with a continuous mass of conductive liquid containing a bubble.

The cartridge 22 comprises a closed, slightly arched, transparent, dielectric envelope 40 which is filled with a conductive liquid as mercury 41, except for the bubble 42 contained therein. Into one end of said envelope 40, there extends a conductive element 43 which is of sufficient length or proper position therein so that it is in constant contact with the mercury even when said bubble is at that end of the cartridge. The preferably semi-circular legs 44 and 45 of a substantially U-shaped conductive wire element 46, straddle the said envelope whose mid-section is between said legs. The distal ends 44' and 45' of said legs are bent and entered into said envelope. The distance between said legs 44, 45, and hence the distance between said ends 44', 45', is minutely less than the length of said bubble 42 along the envelope 40, so that when the bottom surface 18 of the level 15 is in true horizontal position, said bubble shall encompass the distal ends 44', 45' and isolate them from the mercury 41, but at all out-of-true positions of the level 15, at least one of distal ends will be in contact with the mercury.

As shown in FIG. 6, the switch 30, the lamp 26 and the dry cell 24, as a group, are connected in series. One terminal of this group is connected by a conductor 47 to the conductive element 43, and the other terminal of said group is connected by a conductor 48 to the conductive element 46.

This level 15, like most other levels employing a bubble cartridge, requires one setting to get a reading from side to side and then at another setting, a reading is gotten from front to rear, because the level is true in only one direction at any one setting, that is, what is called true position is that when a line on the level's bottom surface 18 along the length of the level is along the horizontal.

It is evident that when the switch 30 is closed and the level 15 is in true position, the bulb 26 will be out, for the circuit is open since both ends 44', 45' of the conductive element 46 will be within the bubble 42, but during the entire time the level is out of true position, the bulb 26 will be lit for the circuit is closed, since at least one of the ends 44', 45' will be in contact with the mercury 41. Hence, when the light is extinguished, the user knows that the level 15 is in true position.

If desired, a second bulb 49 may be included in the level 15, as shown in FIG. 7. Here, upon closing the switch 30, said bulb 49 is in closed circuit with the dry cell 24, and so is the bulb 26 only while the level is out of true position. When said level 15 as modified, assumes true position, then the bulb 26 is extinguished. Hence, when the user observes a diminution in the total light, he knows that the level is in true position. Further, the signal light bulb 26 may be colored, if desired, so when he sees only white light, he knows that the level is in true position.

The type of level shown in FIG. 10 employs two cartridges identical in structure to that of 22. These cartridges 22', 22'' are along perpendicular directions as is conventional, and depending which one of them is to be read, a single pole double throw switch 30' is provided to selectively bring them into the circuit of the bulb 26' which is powered by the dry cell 24'. The circuit for this level 15', shown in FIG. 11, has the arrangement that the pole 50 of the switch 30' is connected by a conductor 51 to one terminal of the dry cell 24', whose other terminal is connected by a conductor 52 to one terminal of the bulb 26'. The other terminal of this bulb is connected to the central conductive elements 46' and 46'' of the respective cartridges 22', 22'', while the end conductive elements of said cartridges are respectively connected to the contact terminals 53 and 54 of the switch 30'. Here, when the level 15' is not in use, the pole 50 is in off position as shown in FIG. 11. To have the bulb 26' controlled by the cartridge 22', said pole is set in contact with the contact element 53. To have said bulb controlled by the cartridge 22'', said pole is set in contact with the contact element 54.

The levels 15, 15' are used in conventional manners as is well known, and are serviceable without the use of their electrical systems, by reading bubble position in relation to the legs as 44, 45.

The side ends of the level body may be provided with magnet means which are indicated generally by the numerals 55 and 56 respectively. For such purpose, the body is constructed as shown in FIG. 12, where it is designated generally by the numeral 57. In all respects, said bodies of FIGS. 2 and 12 are identical and include the cartridge 22, but in the body 57, the sockets 58, 59, 60 and 61 are provided to house the permanent magnets 58', 59', 60' and 61' respectively. Iron or steel strips as 62, 62' and 63, 63' are inserted as shown so opposite strips contact the pole ends of said magnets, forming U-magnets extending from each end of the body 57, as channel structures therealong.

The top ends of said strips and the magnet pieces at such ends are flush with the top surface of the level body 57. The bottom ends of said strips and the pieces thereat, are flush with the bottom surface of said level body. The magnet pieces are also flush with the inward edges of said strips. Two magnet pieces are used here with each pair of metal strips to make a U-magnet, because it is desired to have said magnet pieces imbedded in the body member 57. It is evident that in place of the magnet assemblies as shown, merely a magnetized channel U-magnet may be mounted on the side edges of the body 16. This is readily understood without further illustration.

As is well known in this art, the bottom surface of the level assembly may have a lengthwise channel 64 and the crosswise channel 65. These channels as well as those offered by the magnet structures 55, 56, serve the craftsman when working on pipe or in the setting of other cylindrical objects. The magnets of course, permit the level to hold itself attracted to vertical and inclined surfaces of objects made of magnetizable material, leaving the worker's hands free, all of which is well known.

The level devices herein shown are used in conventional manners.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claim rather than to the specific description herein to indicate the scope of this invention.

I claim:

In a level device of the character described, the combination of a body member having an outer surface to be set against an object; said surface being in a plane having a predetermined relation with respect to a horizontal plane, a cartridge fixed on said body, comprising an elongated arched dielectric envelope filled with a continuous mass of conductive liquid having a bubble therein, a first conductive element extending into said envelope and positioned spaced from the central section of said envelope so that said first element is in constant contact with said liquid, at all positions of said body member, a second conductive element extending into the central section of said envelope and so positioned that when said body surface is in said predetermined plane, all of said second conductive element within the envelope, is encompassed by said bubble and at all other positions of said bubble in said envelope, said second element is in contact with said liquid; said second conductive element comprising a substantially U-shaped piece of wire whose distal ends extend into said envelope and spaced therein so the bubble can encompass such distal ends of the wire; the legs of said U-piece of wire being parallel and extending a substantial distance around said envelope; said legs being exposed to view; said cartridge constituting a switch of which said conductive elements are the terminals, an electrically actuable signal means and a circuit including a power source, for actuating said signal means; said switch being interposed in said circuit.

References Cited by the Examiner

UNITED STATES PATENTS

| | | | |
|---|---|---|---|
| 2,338,811 | 1/1944 | Hasbrook | 33—206.5 |
| 2,553,668 | 5/1951 | Morello | 33—207 |
| 3,106,024 | 10/1963 | Lea | 33—207 |
| 3,172,212 | 3/1965 | Pappas | 33—206.5 |
| 3,225,451 | 12/1965 | Olexson et al. | 33—211 X |

FOREIGN PATENTS

| | | |
|---|---|---|
| 72,020 | 1959 | France. |
| 325,143 | 1957 | Switzerland. |

LEONARD FORMAN, *Primary Examiner.*

L. ANDERSON, *Assistant Examiner.*